(12) United States Patent
Courtet et al.

(10) Patent No.: US 11,981,155 B2
(45) Date of Patent: *May 14, 2024

(54) DECORATED LEATHER MANUFACTURING

(71) Applicant: AGFA NV, Mortsel (BE)

(72) Inventors: Vincent Courtet, Mortsel (BE); Jens Lenaerts, Mortsel (BE); Yiru Li, Mortsel (BE)

(73) Assignee: Agfa NV, Mortsel (BE)

( * ) Notice: Subject to any disclaimer, the term of this patent is extended or adjusted under 35 U.S.C. 154(b) by 636 days.

This patent is subject to a terminal disclaimer.

(21) Appl. No.: 17/261,995

(22) PCT Filed: Aug. 7, 2019

(86) PCT No.: PCT/EP2019/071167
§ 371 (c)(1),
(2) Date: Jan. 21, 2021

(87) PCT Pub. No.: WO2020/030668
PCT Pub. Date: Feb. 13, 2020

(65) Prior Publication Data
US 2021/0260905 A1    Aug. 26, 2021

(30) Foreign Application Priority Data
Aug. 10, 2018  (EP) .................... 18188385

(51) Int. Cl.
*B41M 5/00*       (2006.01)
*C08G 71/04*     (2006.01)
(Continued)

(52) U.S. Cl.
CPC ........... *B41M 5/0076* (2013.01); *C08G 71/04* (2013.01); *C09D 11/101* (2013.01);
(Continued)

(58) Field of Classification Search
None
See application file for complete search history.

(56) References Cited

U.S. PATENT DOCUMENTS 2,194,610 A    3/1940  Orthmann et al.
3,892,523 A    7/1975  Redlich et al.
(Continued)

FOREIGN PATENT DOCUMENTS

CN    1664001 A    9/2005
CN    1664002 A    9/2005
(Continued)

OTHER PUBLICATIONS

Written Opinion relating to PCT/EP2019/071167 dated Oct. 21, 2019, 4 pages.
(Continued)

*Primary Examiner* — Katie L. Hammer
(74) *Attorney, Agent, or Firm* — Leydig, Voit & Mayer, Ltd.

(57) ABSTRACT

A manufacturing method for decorating natural leather including the steps of: jetting a decorative image with one or more radiation curable inkjet inks on a leather surface; and curing the radiation curable inkjet inks jetted on the leather surface; wherein the one or more radiation curable inkjet inks include a colorant and a polymerizable composition containing 0 to 15.0 wt % of one or more polyfunctional polymerizable compounds and at least 85.0 wt % of one or more monofunctional polymerizable compounds with the weight percentages based on the total weight of the polymerizable composition; wherein the one or more radiation curable inkjet inks include 0 to 35.0 wt % of organic solvent; and at least 85.0 wt % of one or more monofunctional polymerizable compounds; and wherein the glass transition temperature of the one or more radiation curable inkjet inks (I) is less than 25° C.; and wherein one of the one or more (Continued)

radiation curable inkjet inks includes a white pigment in an amount of at least 17.5 wt % based on the total weight of the radiation curable inkjet ink.

14 Claims, 2 Drawing Sheets

(51) Int. Cl.
  *C08K 3/22* (2006.01)
  *C09D 11/101* (2014.01)
  *C09D 11/322* (2014.01)
  *C09D 175/04* (2006.01)
  *C14C 11/00* (2006.01)

(52) U.S. Cl.
  CPC .......... *C09D 11/322* (2013.01); *C09D 175/04* (2013.01); *C14C 11/006* (2013.01); *C08K 3/22* (2013.01); *C08K 2003/2241* (2013.01)

(56) References Cited

U.S. PATENT DOCUMENTS

| | | |
|---|---|---|
| 2005/0197418 A1 | 9/2005 | Graziano et al. |
| 2010/0302300 A1 | 12/2010 | Verdonck |
| 2017/0166767 A1 | 6/2017 | Watanabe et al. |
| 2018/0291218 A1* | 10/2018 | Umebayashi .............. B41J 2/01 |

FOREIGN PATENT DOCUMENTS

| | | | |
|---|---|---|---|
| CN | 1664029 A | 9/2005 | |
| CN | 103052695 A | 4/2013 | |
| CN | 106457862 A | 2/2017 | |
| EP | 1245644 A2 | 10/2002 | |
| EP | 3017960 A1 | 5/2016 | |
| EP | 3222684 A1 | 9/2017 | |
| GB | 111304 | 11/1916 | |
| GB | 565969 | 12/1944 | |
| GB | 2510696 A | 8/2014 | |
| WO | 2013/135828 A1 | 9/2013 | |
| WO | 2016/021652 A1 | 2/2016 | |
| WO | 2016/021655 A1 | 2/2016 | |
| WO | WO-2017104318 A1 * | 6/2017 | ................ B41J 2/01 |

OTHER PUBLICATIONS

International Search Report relating to PCT/EP2019/071167 dated Oct. 21, 2019, 3 pages.

* cited by examiner

DECORATED LEATHER MANUFACTURING

REFERENCE TO RELATED APPLICATIONS

This application is a 371 National Stage Application of PCT/EP2019/071167, filed Aug. 7, 2019, which claims the benefit of European Application No. 18188385.1, filed Aug. 10, 2018, the contents of which are incorporated by reference herein in their entirety.

TECHNICAL FIELD

The present invention relates to the manufacturing of decorated natural leather and leather articles therewith.

BACKGROUND

Natural leather has been decorated by screen printing. However, screen printing is labour intensive as each colour requires an individual screen. This is costly and time consuming, especially when personalization or customization is desired. Recently, digital printing technologies using UV curable inkjet ink have been disclosed for printing on natural leather. UV curable inkjet inks have the advantage that they can be printed on substantially non-absorbing substrates, including natural leather that after tanning and crusting has been coated with a pigmented layer.

For example, WO 2013/135828 (CODUS) discloses a method of printing into leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

Digital printing facilitates the personalization of leather articles, but a high image quality of printed leather is essential for luxury leather articles. In order to enhance the colour brilliancy, usually a white background is used.

One option is to use white leather. The manufacturing of white leather has been known for a long time and can be accomplished by bleaching, see e.g. GB 565969 (LEINER) and U.S. Pat. No. 3,892,523 (ROHM AND HAAS), and incorporating white pigments and salts into the skins or hides, see e.g. U.S. Pat. No. 2,194,610 (VANDERBILT) and GB 111304 A (BLATZ).

However, leather articles come in different colours, such as brown and black. One could print the brown or black background colour onto the white leather, but the luxury appearance of the leather article is substantially decreased when a side of the printed white leather is visible in the leather article or when perforations are present, for example for sewing leather pieces together or for providing aeration in e.g. leather car seats. Furthermore, the use of white leather generally does not help much to reduce colour inconsistencies or surface defects, like scratch marks of barbed wire, that are commonly found on the surface of a natural leather.

Another option for providing a white background is to use a white inkjet ink, as also suggested by the above-mentioned WO 2013/135828 (CODUS) in FIG. 4 and by GB 2510696 A (SERICOL) on page 13, lines 12 and 35. However, it was observed that the application of white inkjet ink in amounts sufficient to mask surface defects, colour and colour inconsistencies of the leather resulted in insufficient flexibility of the printed leather showing cracks in the printed image after multiple bending. The latter was also confirmed by GB 2510696 A (SERICOL) on page 1, lines 26 to 34. The solution for the flexibility problems presented by GB 2510696 A (SERICOL) is to use hybrid radiation curable inks containing large amounts of organic solvent (at least 50 wt % is suggested in claim 1). However, by using radiation curable inks containing large amounts of solvent, the image quality deteriorates as bleeding occurs and effective UV pinning is delayed due to the presence of the organic solvents which need to evaporate first. Furthermore, when high levels of organic solvents are employed, such solvents also tend to evaporate at the nozzles of an inkjet print head during a prolonged non-printing time resulting in so-called failing nozzles (clogged). Reliability of an inkjet printing process is of high economic importance in a manufacturing environment.

Hence, there remains a need for manufacturing methods of decorated leather having high image quality and flexibility, while not sacrificing inkjet printing reliability or the luxury feeling of a leather article.

SUMMARY OF INVENTION

In order to overcome the problems described above, preferred embodiments of the present invention have been realised with a manufacturing method for decorating natural leather as in claim 1.

It was surprisingly found that an inkjet printed leather exhibiting excellent flexibility and image quality could be obtained by using a specific combination of polymerizable compounds taking into account the number of polymerizable groups as well as their glass transition temperature Tg.

The ink layer thickness of a white radiation curable inkjet ink is usually much thicker than that of the colour inkjet inks. It was also observed that a further improvement in flexibility was obtained by increasing the content of the white pigment to a level in the ink above that of 8 to 16 wt %, which is normally applied in UV curable inkjet inks. By increasing the white pigment content, a thinner white ink layer is obtained that also proved to be advantageous for flexibility.

These and other objects of the present invention will become apparent from the detailed description hereinafter.

DESCRIPTION

Definitions

Figure 1:
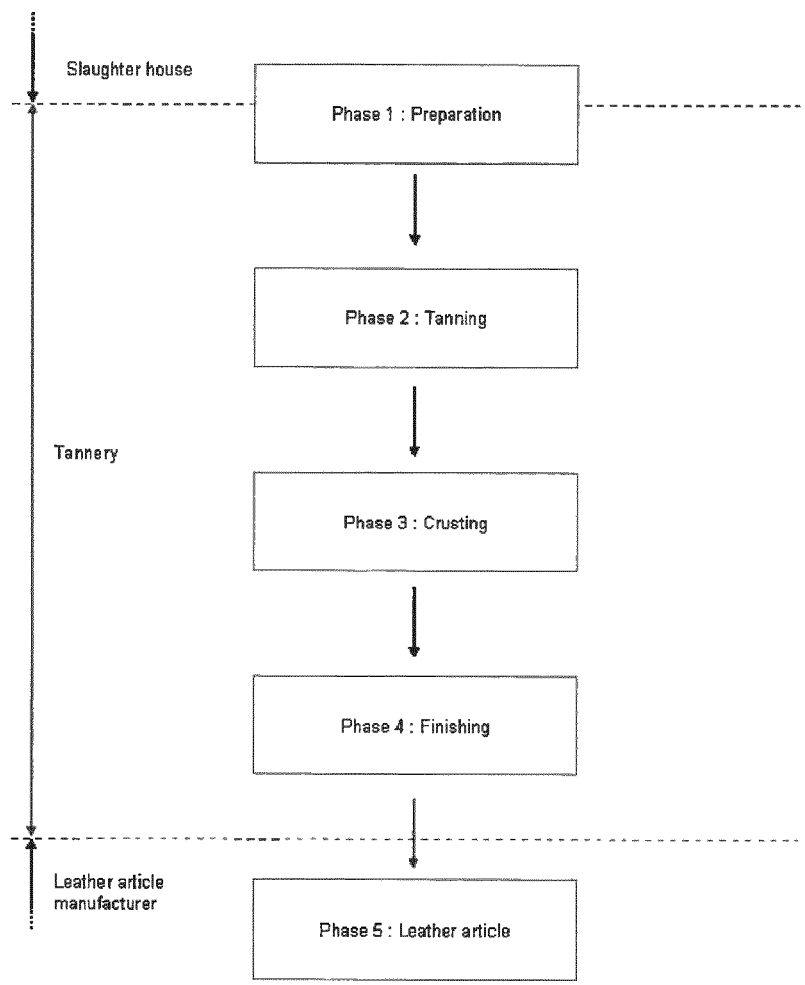
FIG. 1 shows a flow chart of the traditional manufacturing of leather articles involving the different phases and locations.

The term "crusted leather" or "crust leather" means leather that has been tanned and crusted, but not finished.

The term "monofunctional" as used in monofunctional polymerizable compounds means compounds containing a single polymerizable group.

The term "polyfunctional" as used in polyfunctional polymerizable compounds means compounds containing two, three or more polymerizable groups.

The term "radiation curable" means that the inkjet ink is curable by actinic radiation, such as UV radiation and e-beam, preferably UV radiation.

Manufacturing Methods of Decorated Natural Leather

A manufacturing method for decorating natural leather with a decorative image according to a preferred embodiment of the present invention includes the steps of: jetting a decorative image with one or more radiation curable inkjet inks on a leather surface; and curing the radiation curable inkjet inks jetted on the leather surface; wherein the one or more radiation curable inkjet inks include a colorant and a polymerizable composition containing 0 to 15.0 wt % of one or more polyfunctional polymerizable compounds and at least 85.0 wt % of one or more monofunctional polymerizable compounds with the weight percentages based on the total weight of the polymerizable composition; wherein the one or more radiation curable inkjet inks include 0 to 35.0 wt % of organic solvent; and wherein Ink Tg, the glass transition temperature of the one or more radiation curable inkjet inks calculated by Formula (I), is less than 25° C., $$\text{Ink } Tg = \frac{\sum_{i=1}^{n} \text{wt \% } PC(i)}{\sum_{i=1}^{n} \frac{\text{wt \% } PC(i)}{273.15 + TgPC(i)}} - 273.15, \quad \text{Formula (I)}$$

wherein i and n are integers; n is the total number of polymerizable compounds in the radiation curable inkjet ink; TgPC(i) is the glass transition temperature in degrees Celsius of the polymerizable compound PC(i); and wt % PC(i) is the weight percentage of the polymerizable compound PC(i); and wherein all the weight percentages are based on the total weight of the radiation curable inkjet ink.

In a preferred embodiment of the manufacturing method, the glass transition temperature of the one or more radiation curable inkjet inks calculated by Formula (I) is less than 22° C., more preferably between −10° C. and 20° C. and most preferably between −5° C. and 19° C.

In the manufacturing method, one of the one or more radiation curable inkjet inks includes a white pigment present in the radiation curable inkjet ink in an amount of at least 17.5 wt % based on the total weight of the radiation curable inkjet ink. A titanium dioxide pigment, such as rutile, is particularly preferred for the white pigment.

In a preferred embodiment of the manufacturing method, the polymerizable composition contains at least 88.0 wt %, preferably at least 90.0 wt %, more preferably at least 94.0 wt % and most preferably at least 98.0 wt % of one or more monofunctional polymerizable compounds based on the total weight of the polymerizable composition.

In a preferred embodiment of the manufacturing method, the polymerizable composition contains 0.0 to 5.0 wt %, more preferably 0.0 to 2.0 wt % and most preferably 0.0 wt % of polyfunctional polymerizable compounds having more than two polymerizable groups.

In a preferred embodiment of the manufacturing method, the polymerizable composition contains 0.5 to 13.0 wt %, more preferably 1.0 to 9.0 wt % and most preferably 3.0 to 6.0 wt % of one or more polyfunctional polymerizable compounds preferably selected from the group consisting of polyethylene glycol diacrylate, ethoxylated bisphenol A diacrylate, caprolacton-modified neopentylglycoihydroxypivalate diacrylate and ethoxylated hexanediol diacrylate. The inclusion of one or more polyfunctional polymerizable compounds in the above ranges has an advantageous effect on the strength of the ink layer and on the curing speed.

In a preferred embodiment of the manufacturing method, at least 95 wt % of the monofunctional and polyfunctional polymerizable compounds are selected from the group consisting of monomers, oligomers, polymerizable photoinitiators, polymerizable co-initiators, polymerizable surfactants and polymerizable inhibitors.

In a preferred embodiment of the manufacturing method, at least 50 wt %, preferably 60 wt %, more preferably 70 wt % and most preferably 80 wt % of the monofunctional and polyfunctional polymerizable compounds include an acrylate as polymerizable group. The presence of acrylate as polymerizable group in the above ranges of monofunctional and polyfunctional polymerizable compounds advantageously influences the curing speed.

In a preferred embodiment of the manufacturing method, less than 50 wt %, preferably less than 40 wt %, more preferably less than 25 wt % and most preferably none of the monofunctional and polyfunctional polymerizable compounds include a methacrylate as polymerizable group. By limiting the presence of methacrylate as polymerizable group to the above ranges of monofunctional and polyfunctional polymerizable compounds advantageously influences the curing speed.

In a preferred embodiment of the manufacturing method, the radiation curable inkjet inks include 0 to 25 wt %, preferably 0 to 15 wt %, more preferably 0 to 10 wt % of organic solvent based on the total weight of the radiation curable inkjet ink. In the most preferred embodiment, no organic solvent is intentionally added. Image quality is enhanced when less organic solvent is used. If no organic solvent is present, instant UV pinning is possible as no solvent has to be evaporated first.

In a preferred embodiment of the manufacturing method, wherein a photoinitiator in the radiation curable inkjet ink includes one or more acylphosphine oxides. The use of acylphosphine oxides have an advantage in that photoyellowing is minimized upon UV curing. This is especially advantageous for white and cyan inkjet inks, which otherwise would have a slightly yellowish respectively greenish hue.

In a preferred embodiment of the manufacturing method, the one or more radiation curable inkjet inks are jetted on a base coat present on the leather surface. The base coat not only masks imperfections of the leather such as bite marks, but also provides a homogeneous flat surface improving the image quality.

In a preferred embodiment of the manufacturing method, a protective topcoat is applied to the decorative image after at least partially curing the one or more radiation curable inkjet inks jetted on the leather surface. The topcoat prevents the decorative image against scratches when used in the leather article.

In a preferred embodiment of the manufacturing method, the base coat and/or protective top coat includes a polymer or copolymer based on polyurethane.

In a preferred embodiment of the manufacturing method, a heat pressing step and/or an embossing step is applied. A heat pressing step presses the base coat/ink layer/topcoat sandwich into the leather providing improved robustness.

An embossing step allows to imitate, for examples, snake skin leather in a handbag while using bovine leather.

In a preferred embodiment of the manufacturing method, the leather surface is the surface of a crusted leather. Crusted leather provides for the best quality leather end-product, which adds to the luxurious feeling.

There is no limitation in combining any of the above preferred embodiments with each other.

Natural Leather

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Figure 2:
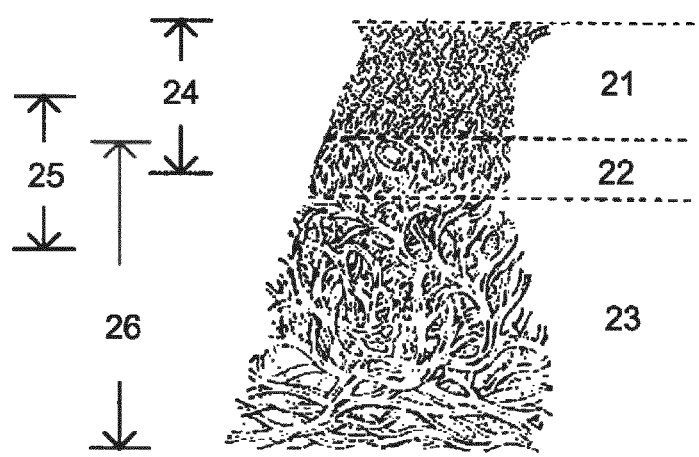
FIG. 2 shows schematically a cross-section of an animal skin including a grain (21) and a corium (23) separated by a junction of grain and corium (22). The different leathers made from the animal skin include full grain leather (24), top grain leather (25) and split leather (26).
Figure 3:
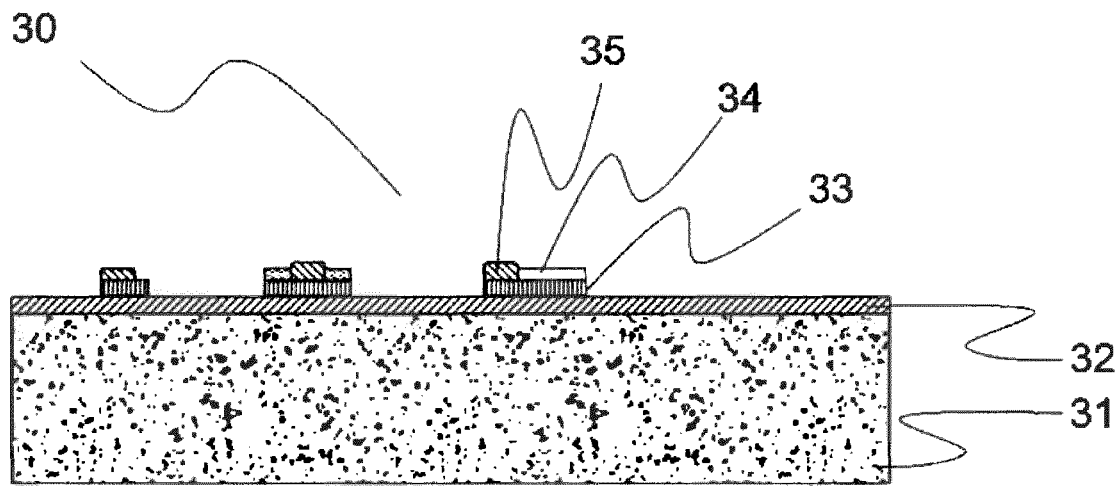
FIG. 3 shows schematically a cross-section of an inkjet printed leather (30) including on the crusted leather (31), with a base coat (32) carrying a radiation curable white inkjet ink (33) and radiation curable colour inkjet inks (34 and 35).
Figure 4:
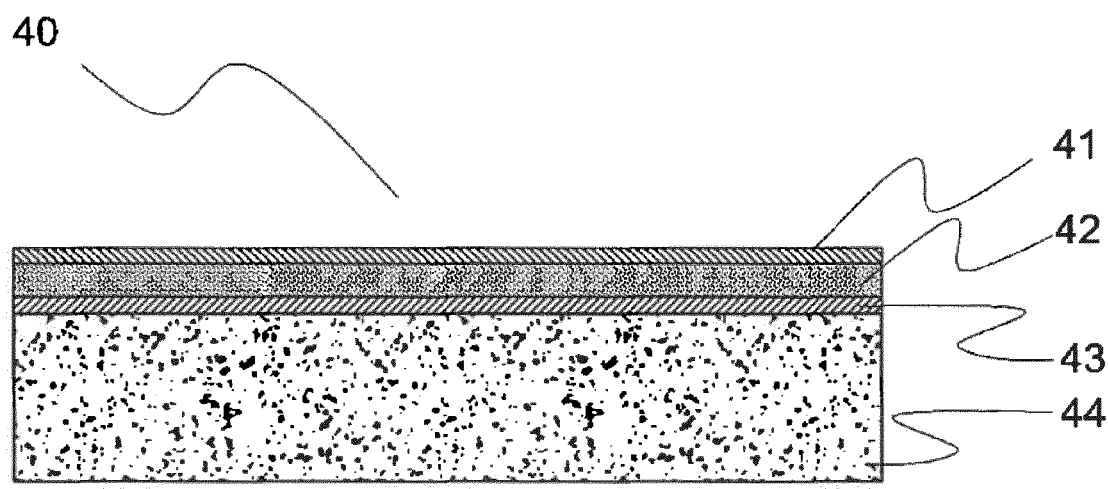
FIG. 4 shows schematically a cross-section of a decorated natural leather (40) including on the crusted leather (44) with a base coat (43), an inkjet printed decorative image (42) and a protective top coat (41).

Natural leather comes in different grades (see FIG. 2), such as full grain (24), top grain (25) which is essentially full-grain but with part of the grain layer sanded and the underlying split layer removed, and split leather (26). For the latter, the underlying layer of the cowhide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

In the present invention, a decorated leather is obtained by the above described manufacturing method. The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books, stationary, interior decoration, packaging, equestrian articles, and the like.

Radiation Curable Inkjet Inks

In the present invention a radiation curable inkjet ink is used for decorating leather. The radiation curable inkjet ink includes 0 to 35.0 wt % of organic solvent; wherein the one or more radiation curable inkjet inks include a colorant and a polymerizable composition containing 0 to 15.0 wt % of one or more polyfunctional polymerizable compounds and at least 85.0 wt % of one or more monofunctional polymerizable compounds with the weight percentages based on the total weight of the polymerizable composition; and wherein Ink Tg, the glass transition temperature of the one or more radiation curable inkjet inks calculated by Formula (I), is less than 25° C., $$\text{Ink } Tg = \frac{\sum_{i=1}^{n} \text{wt \% } PC(i)}{\sum_{i=1}^{n} \frac{\text{wt \% } PC(i)}{273.15 + TgPC(i)}} - 273.15, \quad \text{Formula (I)}$$

wherein
i and n are integers; n is the total number of polymerizable compounds in the radiation curable inkjet ink; TgPC(i) is the glass transition temperature in degrees Celsius of the polymerizable compound PC(i); and wt % PC(i) is the weight percentage of the polymerizable compound PC(i); and wherein all the weight percentages are based on the total weight of the radiation curable white inkjet ink.

Another object of the present invention is a radiation curable white inkjet ink and an inkjet ink set therewith. In a preferred embodiment, the radiation curable white inkjet ink includes 0 to 35.0 wt % of organic solvent; at least 17.5 wt % of a white pigment, preferably a titanium dioxide pigment, and a polymerizable composition containing 0 to 15.0 wt % of one or more polyfunctional polymerizable compounds; and at least 85.0 wt % of one or more monofunctional polymerizable compounds; and wherein Ink Tg, the glass transition temperature of the radiation curable white inkjet ink, calculated by Formula (I) is less than 25° C., $$\text{Ink } Tg = \frac{\sum_{i=1}^{n} \text{wt \% } PC(i)}{\sum_{i=1}^{n} \frac{\text{wt \% } PC(i)}{273.15 + TgPC(i)}} - 273.15, \quad \text{Formula (I)}$$

wherein i and n are integers; n is the total number of polymerizable compounds in the radiation curable white inkjet ink; TgPC(i) is the glass transition temperature in degrees Celsius of the polymerizable compound PC(i); and wt % PC(i) is the weight percentage of the polymerizable compound PC(i); and wherein all the weight percentages are based on the total weight of the radiation curable white inkjet ink.

In a preferred embodiment, the radiation curable inkjet ink includes 0 to 25.0 wt %, preferably 0 to 15.0 wt %, more preferably 0 to 10.0 wt % of organic solvent based on the total weight of the radiation curable inkjet ink. In the most preferred embodiment, no water or organic solvent is intentionally added. Reliability of the inkjet printing is improved when organic solvent is used in the above ranges, as evaporation causing ink viscosity changes and nozzle clogging is then minimized.

In a preferred embodiment of the radiation curable inkjet ink, the polymerizable composition contains at least 88.0 wt %, preferably at least 90.0 wt %, more preferably at least 94.0 wt % and most preferably at least 98.0 wt % of one or more monofunctional polymerizable compounds. Higher flexibility is observed when the one or more monofunctional polymerizable compounds are used in the above concentration ranges.

In a preferred embodiment of the radiation curable inkjet ink, the polymerizable composition contains preferably 0.5 to 13.0 wt %, more preferably 1.0 to 9.0 wt % and most preferably 3.0 to 6.0 wt % of one or more polyfunctional polymerizable compounds. The use of one or more polyfunctional polymerizable compounds in the above ranges improves the curing speed and the strength of the ink layer without having a major detrimental effect on flexibility.

In a preferred embodiment of the radiation curable inkjet ink, the polymerizable composition contains 0.5 to 10.0 wt %, more preferably 1.0 to 8.0 wt % and most preferably 2.0 to 5.0 wt % of one or more polyfunctional polymerizable compounds selected from the group consisting of polyethylene glycol diacrylate, ethoxylated bisphenol A diacrylate, caprolacton-modified neopentylglycol hydroxypivalate diacrylate and ethoxylated hexanediol diacrylate. Using one or more of these polyfunctional polymerizable compounds provides excellent results for flexibility, curing speed and ink layer strength.

In a preferred embodiment of the radiation curable inkjet ink, the polymerizable composition contains 0.0 to 5.0 wt %, more preferably 0.0 to 2.0 wt % and most preferably 0.0 wt % of polyfunctional polymerizable compounds having more than two polymerizable groups.

In a preferred embodiment of the radiation curable inkjet ink, at least 98 wt %, preferably 99 wt % and most preferably 100 wt % of the monofunctional and polyfunctional polymerizable compounds are selected from the group consisting of monomers, oligomers, polymerizable photoinitiators, polymerizable co-initiators, polymerizable surfactants and polymerizable inhibitors.

In a preferred embodiment of the radiation curable inkjet ink, at least 50 wt %, preferably 60 wt %, more preferably 70 wt % and most preferably 80 wt % of the monofunctional and polyfunctional polymerizable compounds include an acrylate as polymerizable group. Use of monofunctional and polyfunctional polymerizable compounds include an acrylate group in the above ranges is advantageous for curing speed.

In a preferred embodiment of the radiation curable inkjet ink, less than 50 wt %, preferably less than 40 wt %, more preferably less than 25 wt % and most preferably none of the monofunctional and polyfunctional polymerizable compounds include a methacrylate as polymerizable group. Use of monofunctional and polyfunctional polymerizable compounds include a methacrylate group in the above ranges is advantageous for curing speed.

In a preferred embodiment of the radiation curable inkjet ink, the radiation curable inkjet ink is a free radical curable inkjet ink, more preferably a free radical UV curable inkjet ink. It was found that cationically curable inkjet inks posed problems of jetting reliability due to UV stray light. UV stray light hitting the nozzle plate of an inkjet print head results into failing nozzles due to clogging by cured ink in the nozzle. Unlike free radical curable ink where radical species have a much shorter lifetime, a cationic curable ink continues to cure once an acid species has been generated by UV light in the nozzle.

For printing multi-colour images, the radiation curable inkjet ink is part of a radiation curable inkjet ink set. A preferred radiation curable inkjet ink set for printing different colours contains at least two or three but most preferably at least four radiation curable inkjet inks in accordance with the invention. The inkjet ink set is preferably a radiation curable CMYK or CRYK inkjet ink set, preferably including a radiation curable white inkjet ink. This inkjet ink set may also be extended with extra inks such as violet, green, red, blue, and/or orange to further enlarge the colour gamut of the image. The radiation curable inkjet ink set may also be extended by the combination of full density inkjet inks with light density inkjet inks. The combination of dark and light colour inks and/or black and grey inks improves the image quality by a lowered graininess.

In a preferred embodiment, the radiation curable inkjet ink contains an organic colour pigment in an amount of 0.1 to 13.0 wt %, preferably 1.0 to 10.0 wt %, more preferably 2.0 to 8.0 wt %, most preferably 2.5 to 7.0 wt % based on the total weight of the radiation curable inkjet ink. In the above ranges the colour gamut is maximized.

For light density colour inkjet inks, the organic colour pigment is preferably present in an amount of 0.1 to 1.0 wt %, preferably 0.2 to 0.9 wt %, more preferably 0.3 to 0.5 wt %, based on the total weight of the radiation curable inkjet ink.

For having a good ejecting ability, the viscosity of the radiation curable inkjet ink at the jetting temperature is preferably smaller than 50.0 mPa·s, more preferably smaller than 30.0 mPa·s, most preferably between 5.0 and 16.0 mPa·s or even between 8.0 and 15.0 mPa·s at a shear rate of $1000\ s^{-1}$ and a jetting temperature between 30 and 70° C., preferably at a temperature of 45° C.

The surface tension of the radiation curable inkjet ink is preferably in the range of 20 mN/m to 30 mN/m at 25° C., more preferably in the range of about 22 mN/m to about 25 mN/m at 25° C. In these ranges, good ink spreading is obtained on a wide range of substrates.

The radiation curable inkjet ink may further also contain at least one inhibitor or stabilizer for improving the thermal stability of the ink.

The UV curable inkjet ink may further also contain at least one surfactant for obtaining good spreading characteristics on a substrate.

There is no limitation in combining any of the above preferred embodiments with each other.

Colorants

The radiation curable inkjet ink contains a colorant. The colorant may be dyes, pigments or a combination thereof. Organic and/or inorganic pigments may be used. The colorant is preferably a pigment or a polymeric dye, most preferably a pigment.

The radiation curable inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

White Pigments

In the manufacturing method, one of the one or more radiation curable inkjet inks includes a white pigment as colorant and present in the radiation curable inkjet ink in an amount of at least 17.5 wt %, preferably 18.5 to 35.0 wt %, more preferably 19.5 to 33.0 wt % and most preferably 20.5 to 25.0 wt % based on the total weight of the radiation curable inkjet ink. In the above ranges, good opacity is obtained with thin white ink layers, while the viscosity does not increase too much so that jetting performance is not impaired. For this, a titanium dioxide pigment, such as rutile, is particularly preferred for the white pigment.

In a preferred embodiment, the polymerizable composition is between 50.0 and 70.0 wt %, preferably 60.0 to 68.0 wt % of the total weight of the radiation curable white inkjet ink.

In the case of a radiation curable white inkjet ink, preferably a pigment with a refractive index greater than 1.60, preferably greater than 2.00, more preferably greater than 2.50 and most preferably greater than 2.60 is used. The white pigments may be employed singly or in combination. Having the above refractive index, the dry thickness of the white ink layer can be minimized which is beneficial for flexibility.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable. Alone or in addition to the previous surface treatments, an organic surface treatment may be used.

The numeric average particle diameter of the titanium oxide or other white pigments is preferably from 180 to 400 nm, more preferably from 200 to 330 nm, and most preferably from 220 to 300 nm. Sufficient hiding power cannot be obtained when the average diameter is less than 180 nm, and the storage ability and the jet-out suitability of the ink tend to be degraded when the average diameter exceeds 400 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Colour Pigments

The colour pigments may be black, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

The colour pigments may be inorganic or organic, but for colour other than black they are preferably organic colour pigments. The latter provide for a higher colour gamut than inorganic pigments.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213. For colour gamut and light stability, most preferably pigments for a yellow inkjet ink are selected from the group consisting of C.I. Pigment Yellow 120, 139, 150, 151, 155, 180, 213 and mixed crystals thereof. The latter provide for good colour reproduction and light stability.

Particular preferred pigments are C.I. Pigment Red 17, 22, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248, 251, 254, 255, 264, 266, 270 and 272.

Particular preferred pigments are C.I. Pigment Violet 19, 23, 32, and 37.

For colour gamut and light stability, most preferably pigments for a magenta or red inkjet ink are selected from the group consisting of CA, Pigment Violet 19, C.I. Pigment Red 122, 176, 202 and 254, as well as mixed crystals containing one of the foregoing. The latter provide for good colour reproduction and light stability.

Particular preferred pigments are C.I. Pigment Blue 15:1, 15:2, 15:3, 15:4, 15:6, 16, 56, 61 and (bridged) aluminium phthalocyanine pigments. For colour gamut and light stability, most preferably C.I. Pigment Blue 15:3, or 15:4 is selected. The latter provide for good light stability.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

Carbon black is preferred as a black pigment. Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

It is also possible to make mixtures of pigments. For example, in a preferred embodiment a neutral black inkjet ink is used. Such a black inkjet ink is preferably obtained by mixing a black pigment and a colour pigment having an absorption maximum between 500 and 700 nm, such as a cyan and/or magenta pigment into the ink. A neutral black inkjet ink avoids the application of cyan or magenta inks for correcting the blackness, which leads to a thinner ink layer having an improved flexibility.

Another object of the present invention is an inkjet ink set including at least a radiation curable inkjet ink containing a beta-copper phthalocyanine pigment, a radiation curable inkjet ink containing a quinacridone pigment or a diketo-pyrrolo pyrrole pigment or a mixed crystal thereof, a radiation curable inkjet ink containing a carbon black pigment and a radiation curable inkjet ink containing a yellow pigment selected from the group consisting of C.I. Pigment Yellow 120, C.I. Pigment Yellow 139, C.I. Pigment Yellow 150, C.I. Pigment Yellow 155, C.I. Pigment 180, C.I. Pigment Yellow 185 and C.I. Pigment Yellow 213 or a mixed crystal thereof. In a preferred embodiment the inkjet ink set further includes the above described radiation curable white inkjet ink.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, while an average particle size larger than 0.200 μm reduces the colour gamut.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

Dispersants

Pigments are usually stabilized in the dispersion medium of polymerizable compounds by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

In the preferred embodiment, the pigment is stabilized by a polymeric dispersant.

The pigment is preferably used in a concentrated pigment dispersion for preparing inkjet inks in an amount of 10 to 40 wt %, more preferably of 15 to 30 wt % based on the total weight of the pigment dispersion. The concentrated pigment dispersion is then diluted into a radiation curable inkjet ink.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

The polymeric dispersant has preferably a number average molecular weight Mn between 500 and 30000, more preferably between 1500 and 10000. Larger molecular weight dispersants tend to increase the viscosity of the ink too much without adequately providing good dispersion stability.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from BASF;
- DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 300 wt %, more preferably 10 to 100 wt %, most preferably 50 to 90 wt % based on the weight of the pigment. An amount between 2 and 90 wt % provides for a good dispersion stability in combination with minimal effect on the ink viscosity.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio wt % polymeric dispersant/wt % dispersion synergist is selected between 2:1 to 100:1, preferably between 2:1 and 20:1.

Suitable dispersion synergists that are commercially available include Salsperse™ 5000 and Solspersel™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerizable Compounds

Polymerizable compounds are polymerized into a polymer. This polymer can be in "rubbery" state or in a "glassy" state. The glass transition is the gradual and reversible transition in amorphous materials (or in amorphous regions within semicrystalline materials), from a hard and relatively brittle glassy state into a viscous or rubbery state as the temperature is increased. The glass-transition temperature Tg of a material characterizes the range of temperatures over which this glass transition occurs. It is always lower than the melting temperature of the crystalline state of the material, if one exists. The value of the Tg for a polymer is important because it affects its mechanical properties.

Radiation curable inkjet inks usually contain a mixture of polymerizable compounds as their chemical properties influence multiple desirable physical properties such as adhesion, curing speed, and the like.

In the present invention the polymerizable composition was composed to have a high amount of monofunctional polymerizable compounds. When taking the amount and the Tg of the individual polymerizable compounds into account, it was possible to design inkjet inks that meet the desired flexibility, while other properties as jetting reliability and image quality were maintained.

The Fox equation can be used to estimate the glass transition temperature of polymer blends and statistical copolymers. The Fox equation states that the reciprocal of the calculated glass transition temperature (Tg) of a mixture of polymerizable compounds is equal to the summation over each component of the weight fraction of each polymerizable compound (wt % PC(i)) divided by its glass transition temperature (TgPC(i)) expressed in Kelvin.

$$\frac{1}{Tg} = \sum_{i=1}^{n} \frac{\text{wt \% } PC(i)}{TgPC(i)} \quad \text{Formula (a)}$$

In calculating the glass transition of an ink, only the polymerizable compounds which do not phase separate upon polymerization are included in the calculation. In this case, the Fox equation is modified as $$\frac{Wtot}{Tg} = \sum_{i=1}^{n} \frac{\text{wt \% } PC(i)}{TgPC(i)}, \quad \text{Formula (b)}$$

wherein Wtot is the total weight fraction of the n polymerizable compounds and which do not phase separate upon polymerization. An example of a material known to phase-separate upon polymerization of acrylates is an acrylated-polymethylmethacrylate-macromer such as Elvacite™ 1010.

The relevant glass transition temperatures, TgPC(i), used in the above equation are those of the homopolymer of the polymerizable compound. For a glass transition temperature of a polymerizable compound that is not listed in Table 1 here below, one can simply rely on the glass transition temperature mentioned in the manufacturers' datasheet for that polymerizable compound. However, when in doubt what the exact Tg of a certain polymerizable compound is, the method for determining the Tg to be taken is the DSC method as explained in ISO 11357-2:1999.

In Formula (b), the total weight fraction of the n polymerizable compounds is given by Formula (c):

$$Wtot = \sum_{i=1}^{n} \text{wt \% } PC(i). \quad \text{Formula (c)}$$

By including Formula (c) into Formula (b) and using degrees Celsius for the glass transition temperatures instead of degrees Kelvin, Formula (b) can be re-arranged to obtain the glass transition temperature of a radiation curable ink (Ink Tg) as shown by Formula (I). For good flexibility, the calculated Ink Tg should be less than 25° C., preferably even less than 20° C., and most preferably less than 18° C.

Any polymerizable compound commonly known in the art may be employed. The polymerizable compound may be any monomer and/or oligomer found in the Polymer Handbook Vol 1+2, 4th edition, edited by J. BRANDRUP et al., Wiley-Interscience, 1999.

Preferably a monomer or oligomer capable of free radical polymerization is used as polymerizable compound, for reasons of printing reliability. A combination of monomers and oligomers may be used. The monomers and oligomers may possess different degrees of functionality, and a mixture including combinations of mono-, di-, tri- and higher functionality monomers and oligomers may be used. The viscosity of the UV curable inkjet inks can be adjusted by varying the ratio between the monomers and oligomers.

The glass transition temperature for suitable polymerizable compounds in the present invention is given in Table 1 here below.

TABLE 1

| Polymerizable compound | Tg (° C.) |
|---|---|
| di-ethyleneglycolbutyletheracrylate | −74 |
| 2-ethyl hexyl acrylate | −70 |
| ethoxydiethyleneglycolacrylate | −70 |
| di(ethylene glycol) 2-ethylhexyl ether acrylate | −68 |
| methoxy polyethylene glycol (550) monomethacrylate | −65 |
| lauryl methacrylate | −65 |
| octyl-decylacrylate | −65 |
| n-octylacrylate | −65 |
| 4-hydroxybutylacrylateglycidylether | −64 |
| 2-hydroxyethylmethacrylate acidphosphate | −63 |
| methoxypolyethyleneglycol(350)monomethacrylate | −62 |
| isodecyl acrylate | −60 |
| isononyl acrylate | −58 |
| methoxypolyethyleneglycol(350)monoacrylate | −57 |
| tridecyl acrylate | −55 |
| 2(2-ethoxyethoxy) ethyl acrylate | −54 |
| isooctyl acrylate | −54 |
| butylacrylate | −54 |
| methoxy polyethylene glycol (550) monoacrylate | −50 |
| 2-methoxyethyl acrylate | −50 |
| ethoxylated (4) lauryl acrylate | −45 |
| iso-amylacrylate | −45 |
| methoxy-triethyleneglycolacrylate | −45 |
| ethoxylated(2) hydroxyethyl methacrylate | −42 |
| ethoxylated(30) bisphenol A diacrylate | −42 |
| polyethylene glycol (600) diacrylate | −42 |
| ethoxylated(8) nonylphenolacrylate | −41 |
| isodecylmethacrylate | −41 |
| ethoxylated(20) trimethylolpropane triacrylate | −40 |
| 4-hydroxy butyl acrylate | −40 |
| tridecyl methacrylate | −40 |
| polyethylene glycol (600) dimethacrylate | −39 |
| 1H,1H,5H-octafluoropentylacrylate | −35 |
| ethoxylated(15) trimethylolpropane triacrylate | −32 |
| 2-ethoxyethylmethacrylate | −31 |
| lauryl acrylate | −30 |
| caprolacton-modified(6M)neopentylglycolhydroxy pivalate diacrylate | −29 |
| ethoxylated(4) nonylphenol acrylate | −27 |
| polyethylene glycol (400) diacrylate | −25 |

TABLE 1-continued

| Polymerizable compound | Tg (° C.) |
| --- | --- |
| phenoxypolyethyleneglycolacrylate | −25 |
| ethylacrylate | −24 |
| polyethylene glycol (400) dimethacrylate | −21 |
| ethoxylated(9) trimethylolpropane triacrylate | −19 |
| isostearylacrylate | −18 |
| tetrahydrofurfuryl acrylate | −15 |
| propoxylated(3) trimethylolpropane triacrylate | −15 |
| hydroxyethyl acrylate | −15 |
| propoxylated(5.5) glyceryl triacrylate | −11 |
| 2-ethylhexylmethacrylate | −10 |
| tetraethylene glycol dimethacrylate | −8 |
| ethoxylated(6) trimethylolpropane triacrylate | −8 |
| triethylene glycol dimethacrylate | −8 |
| (2-ethyl-2-methyl-1,3-dioxolan-4-yl)methyl acrylate | −7 |
| 2-hydroxypropyl acrylate | −7 |
| 2-propylheptylacrylate | −7 |
| hexanediol ethoxylated (3) diacrylate | −6 |
| 2,2,2-trifluoroethylacrylate | −5 |
| 2-(((butylamino)carbonyl)oxy)ethylester 2-propenoic acid | −3 |
| ethoxylated(10) bisphenol A dimethacrylate | −1 |
| ethoxylated(10) bisphenol A diacrylate | 2 |
| 3-ethyl-3-oxetanylmethacrylate | 2 |
| 2-phenoxyethyl acrylate | 5 |
| ethoxylated(2) bisphenol A dimethacrylate | 6 |
| benzylacrylate | 6 |
| 2-ethylhexyldiglycolacrylate | 7 |
| stearylacrylate | 9 |
| 2-hydroxybutylacrylate | 9 |
| methylacrylate | 10 |
| cyclic trimethylolpropane formal acrylate | 10 |
| dicyclopentenylacrylate | 10 |
| dicyclopentenyl-oxyethylacrylate | 10 |
| ethoxylated(4)phenolacrylate | 10 |
| polyethylene glycol (200) diacrylate | 13 |
| caprolacton-modified(2M)neopentylglycolhydroxy pivalate diacrylate | 13 |
| cyclohexylacrylate | 15 |
| 2-hydroxy-3-phenoxypropylacrylate | 17 |
| propoxylated(3) glyceryl triacrylate | 18 |
| dimethylaminoethylmethacrylate | 18 |
| 1,4-cyclohexanedimethanolmonoacrylate | 18 |
| ethoxylated(3) trimethylolpropane triacrylate | 20 |
| diethylaminoethylmethacrylate | 20 |
| n-butylmethacrylate | 20 |
| propoxylated(6) trimethylolpropane triacrylate | 21 |
| cyclohexanespriro-2-(1,3-dioxolane-4-yl))methylacrylate | 22 |
| tetraethylene glycol diacrylate | 23 |
| 2-hydroxypropylmethacrylate | 26 |
| trimethylolpropane trimethacrylate | 27 |
| isophorylacrylate | 27 |
| 1,6 hexanediol dimethacrylate | 30 |
| propoxylated neopentyl glycol diacrylate | 32 |
| stearyl acrylate | 35 |
| (octahydro-4,7-methano-1H-indenyl)methyl acrylate | 35 |
| 1H,1H,5H-octafluoropentylmethacrylate | 36 |
| stearyl methacrylate | 38 |
| tetrahydrofurfuryl methacrylate | 40 |
| glycidyl methacrylate | 41 |
| 3,3,5-trimethylcyclohexanolmethacrylate | 42 |
| 1,6 hexanediol diacrylate | 43 |
| 1,4-butanediol diacrylate | 45 |
| dicyclopentenyl-oxyethylmethacrylate | 45 |
| 4-tert.butylcyclohexylacrylate | 47 |
| ethoxylated (2) neopentylglycoldiacrylate | 48 |
| isobutylmethacrylate | 48 |
| 3-methyl-1,5-pentanedioldiacrylate | 50 |
| allylmethacrylate | 52 |
| 2-phenoxyethyl methacrylate | 54 |
| ethoxylated(6) bisphenol A dimethacrylate | 54 |
| benzylmethacrylate | 54 |
| 1,4-butanediol dimethacrylate | 55 |
| tertiarybutylacrylate | 55 |
| 2-hydroxyethylmethacrylate | 55 |
| 2-(2-vinyloxyethoxy)ethyl acrylate | 59 |
| ethoxylated(4) bisphenol A diacrylate | 60 |
| tris (2-hydroxy ethyl) isocyanurate triacrylate | 61 |
| tripropylene glycol diacrylate | 62 |
| trimethylolpropane triacrylate | 64 |
| ethylmethacrylate | 65 |
| diethylene glycol dimethacrylate | 66 |
| dicyclopentadienyl acrylate | 66 |
| ethoxylated(3) bisphenol A diacrylate | 67 |
| ethoxylated (4) pentaerythritol tetraacrylate | 70 |
| di-acetonacrylamide | 77 |
| dioxaneglycoldiacrylate | 78 |
| ethoxylated(4) nonyl phenol methacrylate | 79 |
| 2,2,2-trifluoroethylmetacrylate | 81 |
| cyclohexylmethacrylate | 83 |
| dipentaerythritol pentaacrylate | 90 |
| 1,10-decanedioldiacrylate | 91 |
| isobornyl acrylate | 94 |
| di-trimethylolpropane tetraacrylate | 98 |
| diethylene glycol diacrylate | 100 |
| 1,3-butylene glycol diacrylate | 101 |
| pentaerythritol tetraacrylate | 103 |
| pentaerythritol triacrylate | 103 |
| dipropylene glycol diacrylate | 104 |
| methylmethacrylate | 105 |
| neopentyl glycol diacrylate | 107 |
| tertiarybutylmethacrylate | 107 |
| ethoxylated(4)bisphenol-A-dimethacrylate | 108 |
| isobornyl methacrylate | 110 |
| dihydrocyclopentadienylacrylate | 110 |
| dicyclopentanylacrylate | 110 |
| acryloyl morpholine | 145 |
| N-vinyl caprolactam | 147 |
| dicyclopentanylmethacrylate | 175 |
| tricyclodecane dimethanol diacrylate | 187 |
| tris (2-hydroxy ethyl) isocyanurate triacrylate | 272 |

Photoinitiators and Co-Initiators

The radiation curable inkjet ink is preferably a UV curable inkjet ink. UV curable inkjet inks contain one or more photoinitiators, preferably one or more free radical photoinitiators. A free radical photoinitiator is a chemical compound that initiates polymerization of monomers and oligomers when exposed to actinic radiation by the formation of a free radical.

Two types of radical photoinitiators can be distinguished. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable colourless inkjet liquid may additionally contain co-initiators. Suitable examples of co-initiators can be categorized in three groups:
  (1) tertiary aliphatic amines such as methyldiethanolamine, dimethylethanolamine, triethanolamine, triethylamine and N-methylmorpholine;
  (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
  (3) (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

In a preferred embodiment, the photoinitiator in the radiation curable inkjet ink includes one or more acylphosphine oxides. Preferred acylphosphine oxide photoinitiators include 2,4,6-trimethylbenzoyl-diphenyl-phosphine oxide available as a Darocur™ TPO (manufactured by BASF); and bis(2,4,6-trimethylbenzoyl)-phenyl phosphine oxide available as Irgacure™ 819 (manufactured by BASF).

In a preferred embodiment, the UV curable white inkjet ink includes no thioxanthone type photoinitiator. UV curable white inkjet inks including thioxanthone type photoinitiators generally exhibit undesired photoyellowing.

Specific examples of photo-initiators for the colour and white inkjet inks may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4,6 trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERTI, H-Nu™ 470 and H-Nu™ 470X available from SPECT' t GROUP Ltd.

The photoinitiator may be polymerizable photoinitiator, including one or more polymerizable groups, preferably acrylate groups.

The co-initiator may be polymerizable co-initiator, including one or more polymerizable groups, preferably acrylate groups A preferred amount of photoinitiator is 0 to 30 wt %, more preferably 0.5 to 20 wt %, and most preferably 1.0 to 10 wt % of the total weight of the UV curable inkjet ink.

The UV curable inkjet ink preferably comprises the co-initiator in an amount of 0.1 to 30 wt %, more preferably in an amount of 0.5 to 25 wt %, most preferably in an amount of 1 to 10 wt % of the total weight of the UV curable inkjet ink.

Polymerization Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total radiation curable inkjet ink.

In a preferred embodiment, the polymerization inhibitor is a polymerizable inhibitor, preferably containing one or more acrylate groups for achieving good reactivity.

Surfactants

The radiation curable inkjet ink may contain at least one surfactant. The surfactant can be anionic, cationic, non-ionic, or zwitter-ionic and is preferably added in a total quantity less than 3 wt %, more preferably less than 2 wt %, and most preferably no more than 1 wt % based on the total weight of the radiation curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tegoglide™ 410 from EVONIK.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Method of Manufacturing Inkjet Inks

Pigment dispersions may be prepared by precipitating or milling the pigment in the dispersion medium in the presence of the dispersant.

A method of manufacturing a radiation curable inkjet ink preferable includes the steps of a) milling a colour pigment in the presence of a polymeric dispersant and a polymerizable compound into a concentrated pigment dispersion; and
  b) diluting the concentrated pigment dispersion with polymerizable compounds so that a polymerizable composition is obtained as disclosed above for the manufacturing method of decorated leather and for the radiation curable inkjet inks.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build up of heat, and as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Base Coats

The base coat is applied on the crust leather for providing a level of image quality commensurate to the luxury aspect of leather as otherwise the low viscosity of inkjet inks lets them penetrate rapidly into the leather resulting in a reduced image quality.

The base coat preferably has a colour similar to that of the corium and the grain. Any desired colour may be chosen for the corium or grain and the base coat, such as red, green, brown, black, blue . . . . The corium and grain is usually dyed by dyes during the crusting phase (see Phase 3 in FIG. 1), while usually colour pigments are included in the base coat.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 $g/m^2$.

Suitable polyamides include the PA emulsion types ED310 and 161148 CX from MICHELMAN. The dry weight of the polyamide in the base coat is preferably less than 7 $g/m^2$, more preferably less than 5 $g/m^2$.

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Systems Corporation.

Another type of preferred polymers to be used in the base coat are polyacrylates. Polyacrylates provide good flexibility and stabilize pigment dispersions in the base coat.

In a preferred embodiment, the base coat preferably includes a polymer or copolymer based on polyurethane and polymer or copolymer based on a polyacrylate. Such a combination brings excellent flexibility even in the presence of pigments.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred. The dry weight of the cross-linker in the base coat is preferably less than 1.4 $g/m^2$, more preferably less than 1.0 $g/m^2$.

The base coat is preferably applied by spraying, but may be applied by any coating technique known, such as knife coating, extrusion coating, slide hopper coating and curtain coating.

Top Coats

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The top coat preferably includes a cross-linker and a polymer or copolymer based on polyurethane and/or polyamide.

The top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and C5065-195 from INCOREZ. The dry weight of the polyurethane in the top coat is preferably in the range of 1 to 6 g/m$^2$.

Suitable polyamides include the PA emulsion types ED310 and 161148 CX from MICHELMAN. The dry weight of the polyamide in the top coat is preferably less than 7 g/m$^2$, more preferably less than 5 g/m$^2$.

Although polyurethanes and/or polyamides are preferred as the polymers for the top coat, other polymers may be used preferably in combination with the polyurethanes and/or polyamides. Such polymers preferably have an elongation at break of more than 200%, more preferably 300%. The elongation at break is measured according to 150527-2, for example, with a MTS Exceed™ testing apparatus from MTS Systems Corporation.

Another type of preferred polymers to be used in the top coat are polyacrylates. Polyacrylates provide good flexibility to the top coat.

In a preferred embodiment, the top coat preferably includes a polymer or copolymer based on polyurethane and polymer or copolymer based on a polyacrylate. Such a combination brings excellent flexibility.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the protective top coat to improve the scratch resistance. Preferred cross-linkers include those mentioned above for the base coat. The dry weight of the cross-linker in the protective top coat is preferably less than 1.4 g/m$^2$, more preferably less than 1.0 g/m$^2$.

The top coat is preferably applied by spraying, but may be applied by the same coating techniques as mentioned above for the base coat.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting may be used. Preferred matting agent include silica. A preferred commercially available example of a silica dispersion is Euderm™ SN2 from LANXESS Inkjet Printing Devices The radiation curable inkjet inks may be jetted by one or more print heads ejecting small droplets of ink in a controlled manner through nozzles onto an ink-receiver surface, which is moving relative to the print head(s).

A preferred print head for an inkjet printing system in the present invention is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method in the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

Curing Devices

The radiation curable inkjet inks in the present invention are cured by exposing them to actinic radiation, preferably to ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

It is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a preferred embodiment of the method of inkjet printing according to the present invention, the inkjet printing device contains UV LEDs with a wavelength larger than 360 nm, preferably UV LEDs with a wavelength larger than 380 nm, and most preferably UV LEDs with a wavelength of about 395 nm.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified. The water used was demineralized water.

TiO2 is a titanium dioxide pigment available as Tronox™ CR834 from TRONOX PIGMENTS BV.

PB15:4 is an abbreviation used for Hostaperm™ Blue P-BFS, a C.I. Pigment Blue 15:4 pigment from CLARIANT.

PR122 is a quinacridone pigment available as PIGMENT RED 122 TCR 12203 IJ from TRUST CHEM EUROPE BV.

MP1 is an abbreviation used for a quinacridone pigment available as Fastogen™ super magenta CBR5 from SUN CHEMICAL BV.

PY155 is a C.I. Pigment Yellow 155 pigment for which Inkjet™ Yellow 4GC from CLARIANT was used.

PB7 is an abbreviation used for Special Black™ 550, which is a carbon black available from EVONIK DEGUSSA.

SYN is the dispersion synergist according to Formula (A):

Formula (A)

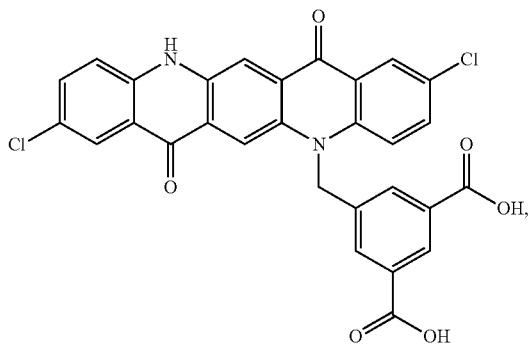

and was synthesized in the same manner as described in Example 1 of WO 2007/0602 (AGFA GRAPHICS) for the synergist QAD-3.

E7701 is a polyacrylate dispersant available as Efka™ 7701 from BASF.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

PEA is 2-phenoxyethyl acrylate available as Sartomer™ SR339C from ARKEMA.

VCL is N-vinyl caprolactam available from BASF BELGIUM, NV.

TBCH is 4-tert.butylcyclohexylacrylate available under the trade name of Sartomer CD217 from ARKEMA.

CD278 is di-ethyleneglycolbutyletheracrylate available as Sartomer™ CD278 from ARKEMA.

IDA is isodecyl acrylate available as Sartomer™ SR395 from ARKEMA.

SR495B is a Caprolactone acrylate monomer available as Sartomer™ SR495B from ARKEMA. It has a Tg of −55° C.

G1122 is a monofunctional urethane acrylate having a $T_g$ of −3° C. and available as Genomer™ 1122 from RAHN having the Formula (B):

Formula (B)

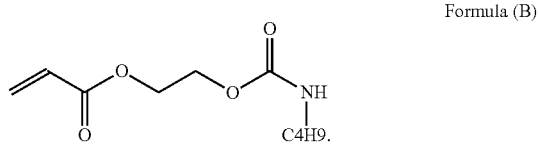

PEG200 is polyethyleneglycol 200 diacrylate available as Sartomer™ SR259 from ARKEMA.

PEG400 is polyethyleneglycol 400 diacrylate available as Sartomer™ SR344 from ARKEMA.

PEG600 is polyethyleneglycol 600 diacrylate available as Sartomer™ SR610 from ARKEMA.

DPGDA is dipropylene glycol diacrylate available as Sartomer™ SR508 from ARKEMA.

SR9003 is propoxylated neopentyl glycol diacrylate available as Sartomer™ SR9003 from ARKEMA.

MPDA is 3-methyl 1,5-pentanediol diacrylate available as Sartomer™ SR341 from ARKEMA.

CN963B80 is a urethane acrylate oligomer available as Sartomer™ CN963B80 from ARKEMA. It has a Tg of 62° C.

CN966H90 is a urethane acrylate oligomer available as Sartomer™ CN966H90 from ARKEMA. It has a Tg of −41° C.;

046 is a mixture of photoinitiators available as Esacure™ KTO 46 from FRATELLI LAMBERTI SPA.

BAPO is a bis(2,4,6-trimethylbenzoyl)-phenylphosphineoxide photoinitiator available as Irgacure™ 819 from BASF.

TPO is trimethylbenzoyl diphenyl phosphine oxide supplied as Omnirad™ TPO by IGM.

ITX is Darocur™ ITX is an isomeric mixture of 2- and 4-isopropyl thioxanthone from BASF.

T410 is a silicone surfactant available as Tegoglide™ 410 from EVONIK.

C7500 is a silicone surfactant available as Silwet™ L7500 from OSI SPECIALTIES BENELUX NV INHIB is a mixture forming a polymerization inhibitor having a composition according to Table 2.

TABLE 2

| Component | wt % |
| --- | --- |
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

STAB UV10 is 4-hydroxy-2,2,6,6-tetramethylpiperidinooxy sebacate available as Irgastab™ UV 10 from BASF.

PA is an anionic polyamide dispersion available as Michem™ Emulsion D310 from MICHELMAN PU is a waterbased polyurethane dispersion available as Urepal™ PU147 from CHEMIPAL S.p.A.

XL is a solvent-based aliphatic polyisocyanate available as Urepal™ CT70 from CHEMIPAL S.p.A.

RL-1 is a red leather obtained from Conceria Nuti Ivo S.P.A. (Italy), which is a red dyed bovine leather crust coated with a red pigmented base coat including an aqueous polyurethane dispersion.

Measurement Methods

1. Viscosity

The viscosity of the UV curable inkjet inks was measured at 45° C. and at a shear rate of $1,000\ s^{-1}$ using a Rotovisco™ RV1 viscometer from HAAKE.

2. Surface Tension

The static surface tension of the UV curable inkjet inks was measured with a KRUSS tensiometer K9 from KRUSS GmbH, Germany at 25° C. after 60 seconds.

3. Average Particle Size of Concentrated Pigment Dispersion (Malvern)

The average particle size of pigment particles in concentrated pigment dispersions was determined by photon correlation spectroscopy at a wavelength of 633 nm with a 4 mW HeNe laser on a diluted sample of the pigmented inkjet ink. The particle size analyzer used was a Malvern™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

4. Average Particle Size

The average particle size (diameter) was determined with a Brookhaven Instruments Particle Sizer BI90plus based upon the principle of dynamic light scattering. The inkjet ink was diluted with ethyl acetate to a pigment concentration of 0.002 wt %. The measurement settings of the BI90plus were: 5 runs at 23° C., angle of 90°, wavelength of 635 nm and graphics=correction function.

5. Flexing

The flexibility was determined on a SATRA™ STM 701 Bally flexometer wherein samples had to endure a cycle of a multiple of 10,000 flexes. The amount of cracks in the leather after the test determines the score. The cracks are evaluated by the naked eye and by a microscope at a 8× magnification according to a criterion shown in Table 3.

TABLE 3

| Score | Criterion |
|---|---|
| OK | No cracks visible by the naked eye. No or almost no cracks visible by microscope |
| NOK | Cracks clearly visible by the naked eye. Sometimes even pealing-off of the ink layer. |

Example 1

This example illustrates the manufacturing method for decorating natural leather with a decorative image using radiation curable white inkjet inks with a specific composition for preventing cracking of the cured ink layer upon flexing.

Preparation of White Inkjet Inks

A concentrated white pigment dispersion W1 was prepared having a composition according to Table 4.

TABLE 4

| wt % of: | W1 |
|---|---|
| TiO2 | 50.0 |
| E7701 | 4.0 |
| INHIB | 1.0 |
| PEA | 45.0 |

The concentrated white pigment dispersion W1 was prepared by mixing the ingredients of Table 4 for 30 minutes in a vessel equipped with a DISPERLUX™ disperser (from DISPERLUX S.A.R.L., Luxembourg). The polymeric dispersant E7701 was added as a 30% solution in PEA. This mixture was subsequently milled in a DYNO™-MILL ECM Poly from the company WAB Willy A. Bachofen (Switzerland) using 0.40 mm yttrium-stabilized zirconium oxide-beads. The bead mill was filled for 42% with the grinding beads and operated in recirculation mode with a residence time of 10 minutes and using a tip speed of 15 m/s. The milling chamber is water-cooled during the operation. The average particle size of pigment particles in concentrated pigment dispersions was found to be 280 nm.

The concentrated white pigment dispersion W1 was then mixed with the components as shown in Table 5 to Table 9 for producing the inventive UV curable white inkjet inks INV-1 to INV-28 and the comparative UV curable white inkjet inks COMP-1 to COMP-5.

TABLE 5

| wt % of | INV-1 | INV-2 | INV-3 | INV-4 | INV-5 | INV-6 | INV-7 |
|---|---|---|---|---|---|---|---|
| TiO2 | 24.00 | 32.00 | 24.00 | 24.00 | 24.00 | 24.00 | 24.00 |
| E7701 | 1.92 | 2.56 | 1.92 | 1.92 | 1.92 | 1.92 | 1.92 |
| PEA | 21.60 | 28.80 | 21.60 | 56.39 | 27.60 | 21.60 | 21.6 |
| VCL | 16.00 | 14.00 | 16.00 | 0.00 | 0.00 | 16.00 | 16.00 |
| TBCH | 0.00 | 0.00 | 0.00 | 7.00 | 0.00 | 0.00 | 0.00 |
| CD278 | 0.00 | 11.95 | 18.23 | 0.00 | 0.00 | 0.00 | 0.00 |
| IDA | 18.23 | 0.00 | 0.00 | 0.00 | 18.23 | 10.00 | 18.23 |
| SR495B | 0.00 | 0.00 | 0.00 | 0.00 | 10.00 | 8.23 | 0.00 |
| G1122 | 10.00 | 2.44 | 10.00 | 2.44 | 10.00 | 10.00 | 10.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 6

| wt % of | INV-8 | INV-9 | INV-10 | INV-11 | INV-12 | INV-13 | INV-14 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 21.60 |
| VCL | 16.00 | 12.00 | 8.00 | 4.00 | 0.00 | 13.00 | 9.00 |
| TBCH | 0.00 | 0.00 | 4.00 | 8.00 | 12.00 | 0.00 | 0.00 |
| IDA | 10.00 | 18.23 | 18.23 | 18.23 | 18.23 | 16.23 | 16.23 |
| SR495B | 8.23 | 0.00 | 0.00 | 0.00 | 0.00 | 0.00 | 0.00 |
| G1122 | 10.00 | 14.00 | 14.00 | 14.00 | 14.00 | 10.00 | 14.00 |
| PEG400 | 0.00 | 0.00 | 0.00 | 0.00 | 0.00 | 5.00 | 5.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 7

| wt % of | INV-15 | INV-16 | INV-17 | INV-18 | INV-19 | INV-20 | INV-21 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 21.60 |
| VCL | 9.00 | 11.00 | 14.00 | 12.00 | 14.50 | 13.00 | 15.00 |
| IDA | 16.23 | 18.23 | 9.50 | 9.00 | 9.00 | 8.00 | 8.50 |
| SR495B | 0.00 | 0.00 | 8.23 | 8.23 | 8.23 | 8.23 | 8.23 |
| G1122 | 14.00 | 10.00 | 10.00 | 10.00 | 10.00 | 10.00 | 10.00 |
| DPGDA | 0.00 | 5.00 | 2.50 | 5.00 | 0.00 | 0.00 | 0.00 |
| MPDA | 0.00 | 0.00 | 0.00 | 0.00 | 2.50 | 5.00 | 0.00 |
| PEG200 | 0.00 | 0.00 | 0.00 | 0.00 | 0.00 | 0.00 | 2.50 |
| PEG400 | 5.00 | 0.00 | 0.00 | 0.00 | 0.00 | 0.00 | 0.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 8

| wt % of | INV-22 | INV-23 | INV-24 | INV-25 | INV-26 | INV-27 | INV-28 |
|---|---|---|---|---|---|---|---|
| TiO2 | 24.00 | 24.00 | 24.00 | 24.00 | 24.00 | 32.00 | 24.00 |
| E7701 | 1.92 | 1.92 | 1.92 | 1.92 | 1.92 | 2.56 | 1.92 |
| PEA | 21.60 | 21.60 | 21.60 | 21.60 | 21.60 | 28.80 | 30.10 |
| VCL | 14.00 | 15.00 | 14.00 | 15.00 | 15.50 | 14.00 | 16.00 |
| IDA | 7.00 | 8.50 | 7.00 | 8.50 | 5.50 | 11.95 | 1.50 |
| SR495B | 8.23 | 8.23 | 8.23 | 8.23 | 8.23 | 0.00 | 8.23 |
| G1122 | 10.00 | 10.00 | 10.00 | 10.00 | 10.00 | 2.44 | 10.00 |
| PEG400 | 0.00 | 2.50 | 5.00 | 0.00 | 0.00 | 0.00 | 0.00 |
| PEG200 | 5.00 | 0.00 | 0.00 | 0.00 | 0.00 | 0.00 | 0.00 |
| PEG600 | 0.00 | 0.00 | 0.00 | 2.50 | 5.00 | 0.00 | 0.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 9

| wt % of | COMP-1 | COMP-2 | COMP-3 | COMP-4 | COMP-5 |
|---|---|---|---|---|---|
| TiO2 | 16.00 | 24.00 | 24.00 | 24.00 | 24.00 |
| E7701 | 1.28 | 1.92 | 1.92 | 1.92 | 1.92 |
| PEA | 34.12 | 42.39 | 33.39 | 33.83 | 33.83 |
| VCL | 20.00 | 14.00 | 20.00 | 15.00 | 15.00 |
| IBOA | 0.00 | 0.00 | 0.00 | 15.00 | 15.00 |
| TBCH | 10.00 | 7.00 | 0.00 | 0.00 | 0.00 |
| IDA | 0.00 | 0.00 | 10.00 | 0.00 | 0.00 |
| SR9003 | 0.00 | 0.00 | 0.00 | 2.00 | 2.00 |
| G1122 | 0.00 | 2.44 | 2.44 | 0.00 | 0.00 |
| CN963B80 | 4.00 | 0.00 | 0.00 | 0.00 | 0.00 |
| KT046 | 4.00 | 4.00 | 4.00 | 4.00 | 4.00 |
| TPO | 2.95 | 2.95 | 2.95 | 2.95 | 2.95 |
| T410 | 0.30 | 0.30 | 0.30 | 0.30 | 0.30 |
| INHIB | 1.00 | 1.00 | 1.00 | 1.00 | 1.00 |
| STAB UV10 | 0.35 | 0.00 | 0.00 | 0.00 | 0.00 |

Results and Evaluation

The viscosity of the white inkjet inks was determined at 45° C. The glass transition temperature Ink Tg was calculated for each inkjet ink according to Formula (I). The "wt % Mono" and "wt % Poly" represent the weight percentages of the monofunctional polymerizable compounds respectively the polyfunctional polymerizable compounds, both based on the total weight of the polymerizable composition.

Each white inkjet ink was printed on a red leather RL-1 with an Anapurna™ M2540 flatbed inkjet printer equipped with a D-bulb curing system in wedges ranging from 10% to 100% ink coverage at 720×1440 dpi. Printed leather patches having the same opacity for the white inkjet ink were selected for flexing at 30,000 flexes.

All results are shown in Table 10.

TABLE 10

| White Ink | Viscosity (mPa · s) | Ink Tg | wt % TiO2 | wt % Mono | wt % Poly | Flexing |
|---|---|---|---|---|---|---|
| INV-1 | 7.7 | 7 | 24 | 98.8 | 1.2 | OK |
| INV-2 | 12.1 | 14 | 32 | 98.6 | 1.4 | OK |
| INV-3 | 8.9 | 7 | 24 | 98.8 | 1.2 | OK |
| INV-4 | 10.8 | 12 | 24 | 98.8 | 1.2 | OK |
| INV-5 | 11.8 | −24 | 24 | 98.8 | 1.2 | OK |
| INV-6 | 12.1 | 8 | 24 | 98.8 | 1.2 | OK |
| INV-7 | 10.9 | 10 | 24 | 97.5 | 2.5 | OK |
| INV-8 | 11.5 | 8 | 24 | 98.8 | 1.2 | OK |
| INV-9 | 8.2 | 0 | 24 | 98.8 | 1.2 | OK |
| INV-10 | 8.3 | −3 | 24 | 98.8 | 1.2 | OK |
| INV-11 | 8.4 | −7 | 24 | 98.8 | 1.2 | OK |
| INV-12 | 8.4 | −10 | 24 | 98.8 | 1.2 | OK |
| INV-13 | 9.2 | 5 | 24 | 91.3 | 8.7 | OK |
| INV-14 | 9.7 | 2 | 24 | 91.3 | 8.7 | OK |
| INV-15 | 10.3 | −1 | 24 | 91.3 | 8.7 | OK |
| INV-16 | 8.1 | 5 | 24 | 91.3 | 8.7 | OK |
| INV-17 | 10.2 | 8 | 24 | 95.0 | 5.0 | OK |
| INV-18 | 10.9 | 9 | 24 | 91.3 | 8.7 | OK |
| INV-19 | 10.7 | 8 | 24 | 95.0 | 5.0 | OK |
| INV-20 | 9.8 | 9 | 24 | 91.3 | 8.7 | OK |
| INV-21 | n.a. | 8 | 24 | 95.0 | 5.0 | OK |
| INV-22 | 11.1 | 9 | 24 | 91.3 | 8.7 | OK |
| INV-23 | 11.5 | 8 | 24 | 95.0 | 5.0 | OK |
| INV-24 | 11.5 | 9 | 24 | 91.3 | 8.7 | OK |
| INV-25 | 12.0 | 7 | 24 | 95.1 | 4.9 | OK |
| INV-26 | 12.8 | 9 | 24 | 91.3 | 8.7 | OK |
| INV-27 | 10.6 | 14 | 32 | 98.6 | 1.4 | OK |
| INV-28 | 13.2 | 19 | 24 | 98.8 | 1.2 | OK |
| COMP-1 | 10.0 | 61 | 16 | 98.8 | 1.2 | NOK |
| COMP-2 | 10.9 | 34 | 24 | 98.8 | 1.2 | NOK |
| COMP-3 | 8.3 | 25 | 24 | 98.8 | 1.2 | NOK |
| COMP-4 | 8.9 | 52 | 24 | 98.8 | 1.2 | NOK |
| COMP-5 | 11.5 | 53 | 24 | 98.8 | 1.2 | NOK |

From Table 10, it should be clear that only the inventive white inkjet inks can sustain a test of 30,000 flexes. The results for the radiation curable white inkjet inks INV-13 to INV-26 illustrate that even a substantial amount of polyfunctional polymerizable compounds may be present. Such amount improves the strength of the ink layer making it more scratch resistant. By increasing the content of titanium dioxide further to 32 wt % in the inkjet ink, flexing remain good even at Ink Tg of 19° C., as illustrated by the inks INV-2 and INV-27. The comparative radiation curable white inkjet inks were not capable of bearing 30,000 flexes even though the weight percentage of polyfunctional polymerizable compounds was minimized and the content of titanium dioxide increased to 24 wt % based on the ink.

Example 2

This example illustrates the inkjet printing of multicolour images on natural leather with a UV curable inkjet ink set that exhibits no cracking.

Concentrated Pigment Dispersions

First concentrated pigment dispersions were made for making a CMYK inkjet ink set.

Cyan Pigment Dispersion CPC

A dispersion was made by mixing the components according to Table 11 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 11

| Component | wt % |
|---|---|
| PB 15:4 | 25.00 |
| D162 | 10.00 |
| PEA | 63.67 |
| INHIB | 1.33 |

Magenta Pigment Dispersion CPM

A dispersion was made by mixing the components according to Table 12 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 12

| Component | wt % |
|---|---|
| PR122 | 20.00 |
| SYN | 1.00 |
| D162 | 10.00 |
| PEA | 67.67 |
| INHIB | 1.33 |

Yellow Pigment Dispersion CPY

A dispersion was made by mixing the components according to Table 13 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 13

| Component | wt % |
|---|---|
| PY155 | 25.00 |
| D162 | 8.00 |
| PEA | 65.73 |
| INHIB | 1.27 |

Black Pigment Dispersion CPB

A dispersion was made by mixing the components according to Table 14 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 14

| Component | wt % |
|---|---|
| PB 15:4 | 5.57 |
| MP1 | 3.89 |
| PB7 | 15.54 |
| SYN | 0.16 |
| D162 | 10.65 |
| PEA | 59.64 |
| DPGDA | 2.16 |
| INHIB | 2.40 |

UV Curable Inkjet Ink Set

A radiation curable CMYK inkjet ink sets was prepared using the above prepared concentrated pigment dispersions and combining them with the other components according to Table 15. The wt % is based on the total weight of the inkjet ink.

TABLE 15

| wt % of | Cyan | Magenta | Yellow | Black |
|---|---|---|---|---|
| CPC | 10.00 | — | — | — |
| CPM | — | 17.50 | — | — |
| CPY | — | — | 12.00 | — |
| CPB | — | — | — | 11.00 |
| VCL | 15.00 | 15.00 | 15.00 | 15.00 |
| PEA | 43.80 | 38.37 | 39.42 | 40.72 |
| IDA | 8.00 | 8.00 | 8.00 | 8.00 |
| SR495B | 10.00 | 10.00 | 10.00 | 10.00 |
| CN966H90 | 3.30 | 1.30 | 2.70 | 2.50 |
| ITX | — | — | 3.00 | 3.00 |
| TPO | 5.00 | 5.00 | 5.00 | 5.00 |
| BAPO | 2.90 | 2.90 | 2.90 | 2.90 |
| INHIB | 1.00 | 0.93 | 0.98 | 0.88 |
| C7500 | 1.00 | 1.00 | 1.00 | 1.00 |

Preparation of Protective Top Coat TC1

A protective top coat TC1 was prepared by mixing the following components according to Table 16.

TABLE 16

| Component | wt % |
|---|---|
| PA | 20.0 |
| PU | 50.0 |
| XL | 2.0 |
| Water | 28.0 |

Results and Evaluation

The properties of the inks in the radiation curable CMYK inkjet ink set were determined and are shown in Table 17.

TABLE 17

| Parameter | Cyan | Magenta | Yellow | Black |
|---|---|---|---|---|
| Viscosity (mPa · s) | 9.8 | 8.4 | 9.2 | 9.5 |
| Surface tension (mN/m) | 31.3 | 31.4 | 31.2 | 31.3 |
| Average Particle Size (nm) | 101 | 117 | 170 | 126 |
| Ink Tg (° C.) | 4 | 5 | 4 | 5 |
| wt % Mono | 83.17 | 83.21 | 80.31 | 80.28 |
| wt % Poly | 4.23 | 2.25 | 3.63 | 3.68 |

The white inkjet ink INV-6 of Example 1 was used for forming a radiation curable CMYKW inkjet ink set that was used for printing a multicolour image with a white background on a red leather RL-1 with an Anapurna™ M2540 flatbed inkjet printer equipped with a D-bulb curing system.

The inkjet printed leather was then spray coated with the protective top coat TC1 using a HS 25 HV3 spray gun from KRAUTZBERGER having a nozzle diameter of 1.2 mm. The coated leather was dried using a Radicure™ D dryer set to a temperature of 280° C. wherein the speed of the conveyor belt is set to the lowest value resulting in a drying time of 2.5 min.

Printed samples were taken from different areas in the multicolour printed leather and tested for flexing. All tested samples exhibited no cracks visible by the naked eye or by microscope at 30,000 flexes.

REFERENCE SIGNS LIST

TABLE 18

| | |
|---|---|
| 21 | Grain |
| 22 | Junction of grain and corium |
| 23 | Corium |
| 24 | Full grain leather |
| 25 | Top grain leather |
| 26 | Split leather |
| 30 | Inkjet printed leather |
| 31 | Crusted leather |
| 32 | Base coat |
| 33 | Radiation curable white inkjet ink |
| 34 | Radiation curable colour inkjet ink |
| 35 | Radiation curable colour inkjet ink |
| 40 | Decorated natural leather |
| 41 | Protective topcoat |
| 42 | Inkjet printed decorative image |
| 43 | Base coat |
| 44 | Crusted leather |

The invention claimed is:

1. A method for manufacturing a decorated natural leather comprising the steps of:
   jetting one or more radiation curable inkjet inks on a leather surface to form a decorative image; and
   curing the one or more radiation curable inkjet inks;
   wherein
   the one or more radiation curable inkjet inks comprise a colorant and a polymerizable composition comprising no polyfunctional polymerizable compounds or up to about 15.0 wt % of one or more polyfunctional polymerizable compounds and at least about 85.0 wt % of one or more monofunctional polymerizable compounds based on a total weight of the polymerizable composition;
   the one or more radiation curable inkjet inks comprise no organic solvent or up to about 35.0 wt % of organic solvent based on a weight of the radiation curable inkjet ink;
   one of the one or more radiation curable inkjet inks comprises at least about 17.5 wt % of a white pigment based on a weight of the radiation curable inkjet ink comprising the white pigment; and
   the glass transition temperature of the one or more radiation curable inkjet inks as calculated by Formula (I) is less than 25° C., $$\text{Ink } Tg = \frac{\sum_{i=1}^{n} \text{wt \% } PC(i)}{\sum_{i=1}^{n} \frac{\text{wt \% } PC(i)}{273.15 + TgPC(i)}} - 273.15 \quad \text{Formula (I)}$$

wherein
i and n are integers;
n is a total number of the monofunctional polymerizable and the polyfunctional polymerizable compounds in the radiation curable inkjet ink;
TgPC(i) is a glass transition temperature in degrees Celsius of a polymerizable compound PC(i); and
Wt % PC(i) is a weight percentage of the polymerizable compound PC(i) based on the weight of the radiation curable inkjet ink.

2. The method of claim 1, wherein the white pigment comprises titanium dioxide.

3. The method of claim 1, wherein the polymerizable composition comprises about 1 wt % to about 10 wt % of the one or more polyfunctional polymerizable compounds, and the one or more polyfunctional polymerizable compounds are selected from the group consisting of polyethylene glycol diacrylate, ethoxylated bisphenol A diacrylate, caprolacton-modified neopentylglycolhydroxypivalate diacrylate, ethoxylated hexanediol diacrylate, and combinations thereof.

4. The method of claim 1, wherein at least about 95 wt % of the monofunctional and polyfunctional polymerizable compounds are selected from the group consisting of monomers, oligomers, polymerizable photoinitiator, polymerizable co-initiators, polymerizable surfactants, polymerizable inhibitors, and combinations thereof.

5. The method of claim 1, wherein the radiation curable inkjet ink comprises a photoinitiator comprising one or more acylphosphine oxides.

6. The method of claim 1, wherein the leather surface comprises a base coat and the one or more radiation curable inkjet inks are jetted on the base coat.

7. The method of claim 6, wherein the base coat comprises a polymer or copolymer based on polyurethane.

8. The method of claim 1, further comprising applying a protective topcoat to the decorative image after at least partially curing the one or more radiation curable inkjet inks.

9. The method of claim 8, wherein the protective top coat comprises a polymer or copolymer based on polyurethane.

10. The method of claim 6, further comprising a heat pressing step or an embossing step.

11. The method of claim 1, wherein a first of the one or more radiation curable inkjet inks is a blue inkjet ink comprising C.I. Pigment Blue 15:3, C.I. Pigment Blue 15:4, and mixed crystals of any thereof.

12. The method of claim 1, wherein a second of the one or more radiation curable inkjet inks is a yellow inkjet ink comprising a pigment selected from the group consisting of C.I. Pigment Yellow 120, C.I. Pigment Yellow 139, C.I. Pigment Yellow 150, C.I. Pigment Yellow 151, C.I. Pigment Yellow 155, C.I. Pigment Yellow 180, C.I. Pigment Yellow 213, and mixed crystals thereof.

13. The method of claim 1, wherein the polymerizable composition comprises about 0.5 wt % to about 13.0 wt % of the one or more polyfunctional polymerizable compounds.

14. The method of claim 1, wherein the leather surface is a crusted leather surface.

* * * * *